United States Patent [19]
Cattano

[11] 3,986,958

[45] Oct. 19, 1976

[54] FILTER FOR SWIMMING POOLS AND THE LIKE

[76] Inventor: Peter Alesandrio Cattano, 44 Miller Ave., Freeport, N.Y. 11520

[22] Filed: June 6, 1975

[21] Appl. No.: 584,579

[52] U.S. Cl. .............................. 210/169; 210/256; 210/342
[51] Int. Cl.² .......................................... E04H 3/20
[58] Field of Search ........... 210/169, 232, 314, 315, 210/316, 409, 433, DIG. 8, 374, 483, 249, 455, 256, 342; 55/378, 361, 433

[56] References Cited
UNITED STATES PATENTS

| | | | |
|---|---|---|---|
| 1,782,538 | 11/1930 | Larkin | 210/483 |
| 1,877,157 | 9/1932 | Cannon | 210/409 |
| 2,851,164 | 9/1958 | Morino | 210/433 |
| 2,889,048 | 6/1959 | Nordin | 210/409 |
| 2,914,180 | 11/1959 | Konopka et al. | 210/169 X |
| 3,012,676 | 12/1961 | Englesberg | 210/169 X |
| 3,355,026 | 11/1967 | Schut | 210/DIG. 8 |
| 3,774,769 | 11/1973 | Smith | 210/232 |
| 3,890,236 | 6/1975 | Harrell | 210/433 |

Primary Examiner—Theodore A. Granger
Attorney, Agent, or Firm—Bauer, Amer & King

[57] ABSTRACT

A fluid filter for swimming pools and the like is disclosed. The filter includes a cylindrical housing internally of which are concentrically and nestingly positioned an inner, primary filter that is generally cup-shaped and an outer generally cup-shaped secondary filter, each of which have transversely extending base walls. The housing of the filter includes fluid inlet and outlet means as well as a valve for opening and closing a drain passageway that provides fluid communication between the interior of the filter and discharge conduit means. The valve includes a flapper that is hingedly secured to the transverse base wall of the primary filter with means being included for raising and lowering the flapper from a remote position such as the top of the cylindrical housing after the cover therefor has been removed. The flapper valve permits the rapid discharge of the filter contents through the discharge conduit to a waste line. The discharge line extends through a base member that rotatably supports the cylindrical housing and is in fluid communication with the flapper valve and the drain passageway.

1 Claim, 2 Drawing Figures 3,986,958

FILTER FOR SWIMMING POOLS AND THE LIKE

The aforementioned Abstract is neither intended to define the invention of the application which, of course, is measured by the claims, nor is it intended to be limiting as to the scope of the invention in any way.

BACKGROUND OF THE INVENTION

Field of the Invention

This invention relates generally to fluid filters and more particularly to an improved filter that is particularly adapted for use in connection with a swimming pool.

SUMMARY OF THE INVENTION

The present invention provides an improved fluid filter that is particularly adapted for use with swimming pools or the like. Filtration is accomplished by means of the present invention without the use of filter media such as sand, diatomaceous earth and/or alum. In place of the foregoing filtering media, the present invention utilizes a pair of cup-shaped nestingly telescoped primary and secondary filters. The primary filter is made from a chemically inert, relatively dense fabric made of synthetic fibers that are mechanically interlocked to provide the desired balance between pore size and permeability. Material such as polypropylene may be used for the primary filter. The secondary filter element, which is positioned between the outside surface of the primary filter element and the inside surface of the filter housing is made of an inert, porous member that is relatively rigid as compared to the primary filter. A material such as polypropylene may be used for the secondary filter. The primary and secondary filters both have a cylindrical side wall and a transverse base wall which, in the assembled condition, rest on a perforated metal baffle that is positioned in the cylindrical filter housing proximate the bottom end thereof. An inwardly directed, circumferential lip that is formed integrally with the housing side wall prevents axial movement of the secondary filter.

A drain passageway provides fluid communication between the interior of the housing and a discharge line that can return the fluid from the filter to either a waste line or to the swimming pool. A flexible flapper is positioned over the upper end of the drain passageway and includes length of cord which is secured at one of its ends to the flapper and at its other end to the upper end of the tank housing so that the flapper may be opened to rapidly discharge the contents of the filter through the discharge line to a waste line.

In the preferred embodiment of the present invention the filter housing is supported in a rotatable manner on a cup-shaped turntable base. An inwardly directed, circumferential lip is formed integrally with the turntable base so as to support the filter housing. Because of the novel turntable base, 360° of flexibility with regard to the direction of the return piping is possible. Because of the rotatability of the filter housing with respect to the base, there is a reduction in flow restriction as compared with filters having fixed mechanical designs.

Accordingly, it is a primary object of this invention to provide an improved fluid filter, particularly for swimming pools and the like.

It is another object of the present invention to provide an improved swimming pool filter, as described above, wherein means are included for rapidly draining the contents of the filter to a waste line.

A further object of the present invention is to provide an improved swimming pool filter or the like, as described above, wherein the filter housing is rotatable relative to a base member therefor.

Another object of the present invention is to provide means, in a swimming pool filter or the like such as described hereinabove, for cleaning the filter elements without requiring the removal of the filter element.

Still another object of the present invention is to provide an improved filter for a swimming pool or the like that is rugged, simple to use, and which requires a minimum of maintenance.

It is a specific object of the present invention to provide an improved swimming pool filter, as described above, that utilizes a washable filter element and which does not require sand, diatomaceous earth and/or alum.

These and other objects, features and advantages of the invention will, in part, be pointed out with particularity and will, in part, become obvious from the following more detailed description of the invention taken in conjunction with the accompanying drawing, which forms an integral part thereof.

BRIEF DESCRIPTION OF THE DRAWING

In the various figures of the drawing, like reference characters designate like parts. In the drawing.

DESCRIPTION OF THE PREFERRED EMBODIMENT

Figure 2:
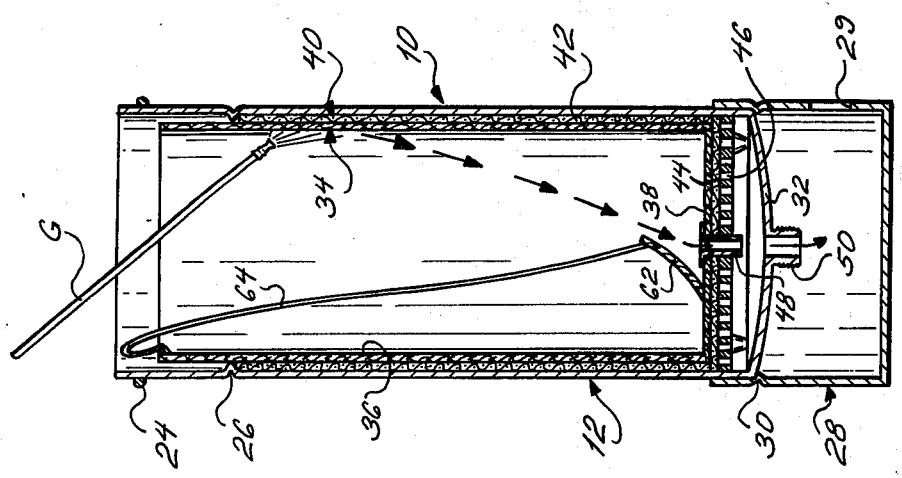
FIG. 2 is a sectional, elevational view of the structure shown in FIG. 1.

The improved fluid filter 10 comprising the present invention includes a cylindrical tank 12 which may be made of stainless steel and which is preferably of welded construction for maximum strength. A fluid inlet 14 is welded to the tank proximate the upper end thereof. The filter 10 also includes a stainless steel cover member 16 having a pressure gauge 18 and a vent or relief valve 20 positioned thereon. The cover member 16 is secured to the tank 12 by means of a clamp ring 22. An O-ring 24 is positioned between the interior surface of the cover member 16 and the exterior surface of the tank 12 in order to provide a fluid seal. For purposes to be described hereinafter, the upper end of the wall of the tank 12 is also provided with an inwardly directed lip 26 that is at least partially circumferential and which is preferably completely circumferential.

A base member generally designated by the reference character 28 is provided for rotatably supporting the tank 12. The base member 28, which has an opening 29 in the side wall thereof, is also made of stainless steel and includes an inwardly directed lip 30 that is at least partially circumferential and which is preferably completely circumferential. The lip 30 supports the base wall 32 of the tank 12 such as shown for example in FIG. 2. By providing universal rotation of the tank 12 with respect to the base 28, 360° of flexibility is available with respect to the direction of return piping. This construction reduces flow restrictions which are normally found in filters having a fixed mechanical design.

Turning now specifically to FIG. 2, it will be seen that there is provided an inner, primary filter 34 which is preferably made of a chemically inert, dense fabric such as polypropylene. The synthetic fibers of the primary filter 34 are mechanically interlocked in order to provide a balance between pore size and permeability. The primary filter 34 includes a cylindrical side wall 36 and a transversely oriented base wall 38. As further shown in FIG. 2, there is also included a secondary filter 40 which may be made of a material such as polypropylene and which includes a cylindrical side wall 42 and a transversely oriented base wall 44. The side wall 42 of the secondary filter 40 is positioned intermediate the side wall 36 of the primary filter 34 and the inside surface of the tank 12. The transverse base wall 38 of the primary filter 34 overlays the transverse base wall 44 of the secondary filter 40. A perforated metal baffle 46 supports the base walls 38 and 44 of the primary and secondary filters 34 and 40, respectively.

Figure 1:
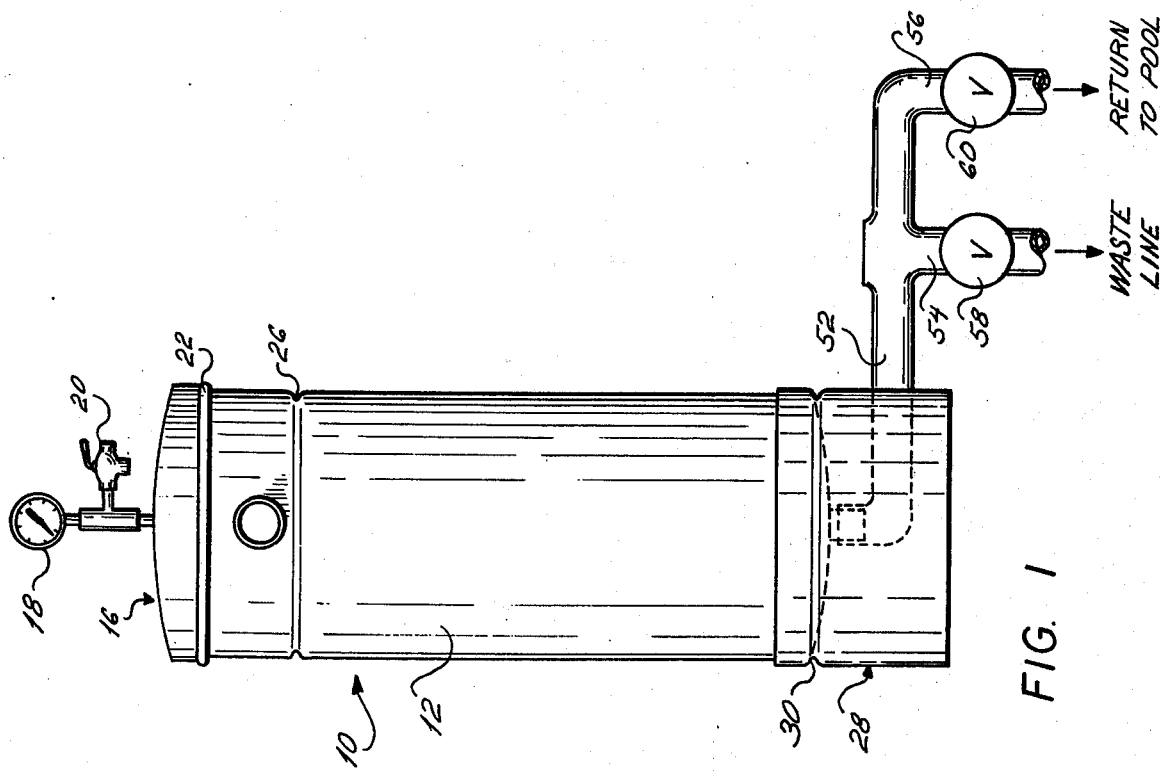
FIG. 1 is an elevational view, partially schematic, of the fluid filter comprising the present invention.

A substantially vertical drain passageway 48 extends through the two base walls 38 and 44 of the primary filter 34 and the secondary filter 40, respectively. The drain passageway 48 terminates in a downwardly extending, externally threaded nipple 50 that is formed integrally with base wall 32 of the housing 12. As shown best in FIG. 1 a discharge line 52 extends through the opening 29 formed in the side wall of the base member 28 and is threadably connected to the nipple 50. The discharge line 52 includes two branches 54 and 56, the first of which is connected to a waste line (not shown) and the second of which is adapted to be connected to provide a return path for the fluid to the pool. Valves 58 and 60 are provided in the waste line and return lines 54 and 56, respectively.

Referring once again to FIG. 2, it will be seen that a flapper 62 is hingedly connected to the transverse base wall 38 of the primary filter 34 and is arranged to normally overlay the upper entrance to the drain passageway 48. An elongated cord 64 is provided having one end fastened to the flapper 62 and the other end thereof secured in any suitable manner proximate the upper end of the filter housing 12.

An important advantage of the present invention resides in the fact that the primary filter 54 can be readily cleaned without removing it from the tank 12. In order to accomplish this, the pump (not shown) is stopped and the relief valve 20 is opened. The clamp ring 22 is also opened and the cover 16 is removed. The cord 64 is then pulled upwardly in order to raise the flap 62 and thereby provide fluid communication between the interior of the primary filter 34 and the discharge line 52. The tank will then drain completely and rapidly. With the flapper 62 in the open position and with the return valve 60 in the closed position a high pressure spray such as may be provided from a conventional garden hose G is used to wash off accumulated dirt from the sides and bottom of the primary filter 34.

The dirt will rapidly drain from the filter surface through the passageway 48, the discharge line 52, the waste line 54 and the valve 58. In order to complete the cleaning cycle, the flap 62 is moved to the closed position over the passageway 48 and then the cover 16 is replaced and securely retained by means of the clamp ring 22. The waste valve 58 is left open and the return valve 60 is kept closed. The pump (not shown) is started and the fluid is allowed to discharge through the waste valve 58 for 5 to 10 seconds in order to clear any remaining dirt from the filter and the lines. The waste valve 58 can be closed and the return valve 60 opened. The pump is then restarted and the relief valve 20 is closed when all air has been evacuated from the filter 10.

There has been disclosed heretofore the best embodiment of the invention presently contemplated. However, it is to be understood that various changes and modifications may be made thereto without departing from the spirit of the invention.

What I claim as new and desire to secure by Letters Patent is:

1. A fluid filter comprising:
   a. a housing having fluid inlet and outlet means;
   b. a primary filter defined by an elongated side wall having an open, upper end and a transversely oriented base wall at the opposite end thereof, said primary filter being positioned within said housing;
   c. a secondary filter positioned intermediate the outside surface of said primary filter and the inside surface of said housing, said secondary filter having an open upper end and a transversely oriented base wall;
   d. outlet means for conducting fluid from the interior of said primary filter and said secondary filter comprising adjacent openings located in the base wall of each of said filters, valve means constructed and arranged to close said openings said valve including a displaceable flap hingedly secured to the interior surface of the base wall of said primary filter in sealing relationship to the openings in the base wall of each of said filters, extension means connected to said flap whereby said valve means may be opened and closed from a remote position adjacent the upper end of said primary filter:
   e. a base member for supporting said housing said base member adapted to be positioned on a supporting surface; and
   f. conduit means extending through said base member, said conduit being in fluid communication with said adjacent openings in the base wall of each of said filters for discharging solid matter from the interiors thereof when said valve means is opened.

* * * * *